United States Patent
Kumazawa et al.

(10) Patent No.: US 10,190,023 B2
(45) Date of Patent: Jan. 29, 2019

(54) SILICA-BASED POLISHING PARTICLE AND ABRASIVE

(71) Applicant: JGC CATALYSTS AND CHEMICALS LTD., Kanagawa (JP)

(72) Inventors: Mitsuaki Kumazawa, Fukuoka (JP); Miki Egami, Fukuoka (JP); Hirotada Arakane, Fukuoka (JP); Ryo Muraguchi, Fukuoka (JP); Toshiharu Hirai, Fukuoka (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 0 days.

(21) Appl. No.: 15/804,251

(22) Filed: Nov. 6, 2017

(65) Prior Publication Data

US 2018/0127627 A1    May 10, 2018

(30) Foreign Application Priority Data

Nov. 7, 2016  (JP) .................................. 2016-216956

(51) Int. Cl.
  *C09G 1/02*    (2006.01)
  *C01B 33/12*   (2006.01)
  (Continued)

(52) U.S. Cl.
  CPC .............. *C09G 1/02* (2013.01); *C01B 33/124* (2013.01); *C01B 33/18* (2013.01); *C09K 3/1409* (2013.01);
  (Continued)

(58) Field of Classification Search
  CPC .......... B24D 3/00; C09K 3/14; C09K 3/1409; C09G 1/00; C09G 1/02; H01L 21/304;
  (Continued)

(56) References Cited

U.S. PATENT DOCUMENTS

| | | | | |
|---|---|---|---|---|
| 6,652,612 | B2 * | 11/2003 | Nakashima | B82Y 30/00 106/3 |
| 2014/0017496 | A1 * | 1/2014 | Fuji | C01B 33/18 428/402 |
| 2017/0001870 | A1 * | 1/2017 | Yoshitake | C01B 33/145 |

FOREIGN PATENT DOCUMENTS

| | | | |
|---|---|---|---|
| JP | H01234319 A | † | 9/1989 |
| JP | H07206451 A | † | 8/1995 |

(Continued)

OTHER PUBLICATIONS

Yasuo Azuma, et. al., Synthesis of Spherical Silica Particles and Their Thermal Behavior, Journal of the Ceramic Association, vol. 94[6], Japan, p. 559 (p. 560, section 3.2, second paragraph), Jun. 1, 1986.†

*Primary Examiner* — Jennifer A Smith
*Assistant Examiner* — Alexandra M Moore
(74) *Attorney, Agent, or Firm* — Greenblum & Bernstein, P.L.C.

(57) ABSTRACT

Provided is a silica-based polishing particle which can polish and flatten the surface of a substrate at a sufficient polishing rate with generation of scratches prevented, and successfully prevents generation of particle residues on a substrate after polishing. A silica-based polishing particle with a three-dimensional polycondensation structure containing an alkoxy group, wherein the particle has an average particle diameter (d) of 5 to 300 nm, an aspect ratio of 1.00 or more and 1.20 or less, and a carbon content of 0.005% by mass or more and less than 0.50% by mass.

11 Claims, 1 Drawing Sheet

(51) Int. Cl.
*C01B 33/18* (2006.01)
*C09K 3/14* (2006.01)

(52) U.S. Cl.
CPC ........ *C09K 3/1454* (2013.01); *C01P 2004/32* (2013.01); *C01P 2004/62* (2013.01); *C01P 2004/64* (2013.01); *C01P 2006/12* (2013.01); *C01P 2006/80* (2013.01)

(58) Field of Classification Search
CPC ......... H01L 21/30625; H01L 21/31053; H01L 21/3212; H01L 21/7684; C01B 33/18; C01P 2004/32; C01P 2004/62; C01P 2004/64; C01P 2006/12; C01P 2006/18; B24C 11/00; B24C 11/005; C08K 3/34; C08K 3/36
See application file for complete search history.

(56) References Cited

FOREIGN PATENT DOCUMENTS

| | | | | |
|---|---|---|---|---|
| JP | H07277752 | † | 10/1995 | |
| JP | 9-324174 A | | 12/1997 | |
| JP | 2003-213249 A | | 7/2003 | |
| JP | 2004315300 A | † | 11/2004 | |
| JP | 2005-060217 A | | 3/2005 | |
| JP | 2010083744 A | † | 4/2010 | |
| JP | 2013-082584 A | | 5/2013 | |
| WO | 2013085574 A1 | † | 6/2013 | |
| WO | WO-2015087965 A1 | * | 6/2015 | ........... C01B 33/145 |

\* cited by examiner
† cited by third party

[FIG. 1]
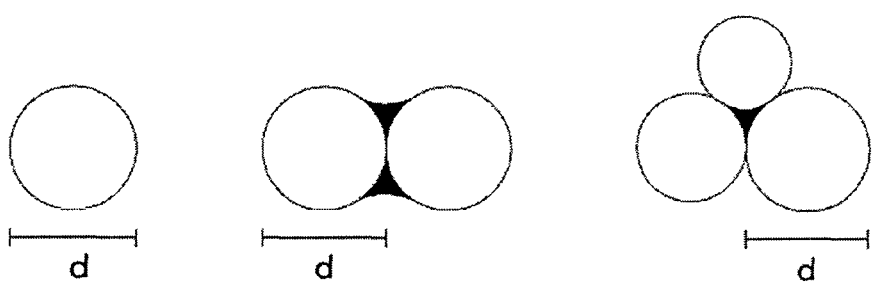
[FIG. 2]
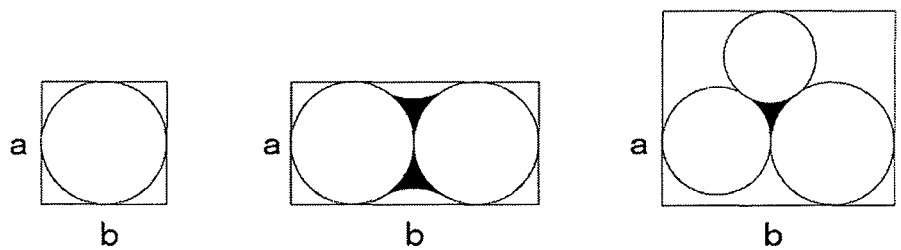

SILICA-BASED POLISHING PARTICLE AND ABRASIVE

BACKGROUND OF THE INVENTION

Field of the Invention

The present invention relates to a silica-based polishing particle useful for flattening of a substrate, in particular, for formation of a metal wiring layer on a semiconductor integrated circuit, etc., and an abrasive including the polishing particle.

Description of the Related Art

Various integrated circuits are used for computers and various electronic devices. As they are downsized and become sophisticated, higher density and higher performance have been required for circuits.

To produce a semiconductor integrated circuit, for example, an interlayer film (insulating film) is formed on a substrate such as a silicon wafer, a groove pattern for a metal wiring is formed on the interlayer film (insulating film), a barrier metal layer of tantalum nitride (TaN) or the like is formed by a sputtering method or the like, as necessary, and then a copper film for a metal wiring is formed by a chemical vapor deposition (CVD) method or the like. Here, when a barrier metal layer of TaN or the like is provided, the barrier metal layer can prevent, for example, lowering of the insulation properties of the interlayer insulating film in association with the diffusion of copper or an impurity or the like to the interlayer insulating film and erosion of the interlayer insulating film, and can enhance the adhesion between the interlayer insulating film and copper.

Subsequently, a film of unnecessary copper and barrier metal (occasionally referred to as "sacrifice layer") formed on a portion out of the groove is removed by polishing with a chemical-mechanical polishing (CMP) method and the upper surface is flattened to the maximum extent possible, and thus a wiring/circuit pattern of copper is formed with a metal film left only in the groove.

The abrasive used in the CMP method is typically composed of: a spherical polishing particle which consists of a metal oxide such as silica and alumina having an average particle diameter of about 5 to 300 nm; an oxidant for increasing the polishing rate of a wiring/circuit metal; an additive such as organic acid; and a solvent such as pure water.

Polishing with a conventional polishing particle of silica, alumina, or the like had a disadvantage that scratches (scars) are observed on the surface of a polished object after polishing, or that scratches are additionally generated by a remaining polishing particle. In this regard, disclosed is an organic-inorganic composite particle as a polishing particle for preventing generation of scratches, which includes ail polymer backbone and a polysiloxane backbone having, in the molecule, an organic silicon as a silicon atom directly chemically bonding to at least one carbon atom in the organic polymer backbone, wherein the content of $SiO_2$ constituting the polysiloxane backbone is 25% by weight or more (e.g., see Japanese Patent Laid-Open No. 9-324174).

Further disclosed is a silica polishing particle capable of suppressing generation of scratches, and polishing to flatten the surface of a substrate at a sufficient polishing rate, wherein the carbon content of alkoxy residues derived from alkoxide in the silica particle is 0.5 to 5% by weight, the 10% compressive elastic modulus is 500 to 3000 kgf/mm$^2$, and the Na content of the silica particle is 100 ppm or less as Na (see Japanese Patent Laid-Open No. 2003-213249).

Furthermore disclosed are: a silica polishing particle with a small content of impurity components, wherein the average secondary particle diameter is 20 to 1000 nm, the silica concentration is 10 to 50% by weight, and the metal impurity content is 1 ppm or less (see Japanese Patent Laid-Open No. 2005-060217); and a polishing particle, wherein the CV value is 20 or less, and the content of sodium, an alkali earth metal selected from calcium and magnesium, a heavy metal selected from iron, titanium, nickel, chromium, copper, zinc, lead, silver, manganese, and cobalt, and anions other than hydroxy anions is 1% by weight or less, respectively (see Japanese Patent Laid-Open No. 2013-082584).

PRIOR ART DOCUMENTS

1. Japanese Patent Laid-Open No. 9-324174
2. Japanese Patent Laid-Open No. 2003-213249
3. Japanese Patent Laid-Open No. 2005-060217
4. Japanese Patent Laid-Open No. 2013-082584

However, the organic-inorganic composite particle disclosed in Japanese Patent Laid-Open No. 9-324174 has different particle hardness depending on the content of $SiO_2$ in the polysiloxane backbone, and provides a lower polishing rate, although fewer scratches are generated, when the organic polymer content is high and the $SiO_2$ content is low. When the organic polymer content is low and the $SiO_2$ content is high, in contrast, scratches are likely to be generated, although a higher polishing rate is provided. However, even when the $SiO_2$ content is set high in a manner such that scratches are not generated, a sufficient polishing rate cannot be achieved, which is a significant disadvantage.

In the case of Japanese Patent Laid-Open No. 2003-213249, an abrasive with a relatively high polishing rate and high surface accuracy (low profile irregularity) can be obtained. However, there is a disadvantage that the abrasive grain (silica polishing particle) attaches after polishing and it is difficult to wash them out. Although the reason for the attachment is not clear, the attachment is presumably because the abrasive grain has excessive —OR groups (alkoxy groups) and hence the alkoxy residues are hydrolyzed by an acid or alkali added during the preparation of a polishing slurry (abrasive) to generate active —OH groups, and the active —OH groups strengthen the interaction with a substrate.

Here, when the carbon content derived from the alkoxy residues is less than 0.50% by weight, the 10% compressive elastic modulus becomes 3000 kgf/mm$^2$ or more and a sufficient polishing rate is achieved. However, scratches are disadvantageously generated to result in a polished surface with insufficient smoothness. It is estimated that the particle is hard because of a small number of alkoxide residues due to progression of formation of siloxane bonds, which leads to a polished surface with deteriorated smoothness, although a high polishing rate is provided.

In the case of Japanese Patent Laid-Open No. 2005-060217 and Japanese Patent Laid-Open No. 2013-082584, silicon alkoxide, as a raw material, is highly pure per se, and hence no problem arises even when an alcohol or a catalyst is directly used for conventional electronic devices. However, a further reduction in the metal impurity content is required as higher integration and higher density are provided to semiconductor integrated circuits.

The above-mentioned problems are those relating to the polishing rate, surface smoothness, particle attachment, and impurity content. In particular, the polishing rate and surface smoothness are in a trade-off relationship. To overcome this relationship, in Japanese Patent Laid-Open No. 2003-213249, the carbon content derived from alkoxide in the silica particle is set to 0.5 to 5% by weight, and the 10% compressive elastic modulus is set to 500 to 3000 kgf/mm$^2$ to resolve the problem. However, it has been revealed that particles attached to a substrate are not completely removed when washing after polishing, and a state in which particles are attached to the substrate (a state in which what is called "particle residues" due to particle attachment is present) is caused.

An object of the present invention is to provide a silica-based polishing particle which can polish and flatten the surface of a substrate at a sufficient polishing rate while preventing generation of scratches, and further successfully preventing particle residues on the substrate after polishing, and an abrasive including the silica-based polishing particle.

SUMMARY OF THE INVENTION

The silica-based polishing particle according to the present invention is a silica-based particle with a three-dimensional polycondensation structure containing an alkoxy group, wherein the particle has an average particle diameter (d) of 5 to 300 nm, an aspect ratio of 1.00 or more and 1.20 or less, and a carbon content of 0.005% by mass or more and less than 0.50% by mass. By virtue of this configuration, the silica-based particle has a high hardness and has a true spherical shape or a generally spherical shape, and hence less particle aggregation is caused when a polishing slurry is prepared, and thus the dispersibility is high. That is, the silica-based polishing particle according to the present invention provides a higher polishing rate in polishing by virtue of the high hardness, and provides higher smoothness in polishing by virtue of less particle aggregation and the high dispersibility in the preparation of a slurry due to the generally spherical shape, and leaves "particle residues" on a substrate by virtue of the smaller number of alkoxy groups in the particle. Thus, four requirements for an abrasive, namely, the polishing rate, smoothness, prevention of generation of scratches, and prevention of generation of particle residues, can be simultaneously satisfied.

It is preferred that, in the silica-based particle, the content of each of alkali metals, alkali earth metals, Fe, Ti, Zn, Pd, Ag, Mn, Co, Mo, Sn, Al, and Zr is less than 0.1 ppm, the content of each of Cu, Ni, and Cr is less than 1 ppb, and the content of each of U and Th is less than 0.3 ppb. By virtue of this configuration, the silica-based particle can be used as an abrasive grain for highly integrated logics and memories with a wiring node of 40 nm or less, and for three-dimensional implementation.

In addition, it is preferred that, in the silica-based particle, the ratio of the dynamic light scattering particle diameter ($\gamma$) to the average particle diameter (d), ($\gamma$/d), is 1.00 or more and 1.50 or less. At a ratio ($\gamma$/d) within this range, the silica-based particles are present without being aggregated, and advantageously provide a high polishing rate in polishing, even though the elasticity of the particle is poor, and provides high smoothness with fewer "particle residues" left on the substrate.

Further, it is preferred that the ratio of the equivalent spherical particle diameter ($\gamma^1$) calculated from the specific surface area in accordance with a BET method to the average particle diameter (d), ($\gamma^1$/d), is 0.80 or more and less than 1.00. At a ratio ($\gamma^1$/d) within this range, the silica-based particles includes porous particles, and thus the particles are not hard even though the elasticity of the particles themselves is poor, and a polished substrate with higher smoothness can be obtained even with a high polishing speed.

The abrasive according to the present invention is characterized by including the silica-based particle.

The silica-based polishing particle and the abrasive including the silica-based polishing particle according to the present invention can polish and flatten the surface of a substrate at a sufficient polishing rate while preventing generation of scratches, and further preventing particle residues on the substrate after polishing.

BRIEF DESCRIPTION OF THE DRAWINGS

FIG. 1 shows diagrams illustrating a method for calculating the average particle diameter (d) in the present invention, wherein each solid black area represents an interparticle junction part, and each interparticle junction part may include a space.

FIG. 2 shows diagrams illustrating a method for calculating the aspect ratio (b/a; provided that b≥a) in the present invention, wherein each solid black area represents an interparticle junction part, and each interparticle junction part may include a space.

DETAILED DESCRIPTION OF THE PREFERRED EMBODIMENTS

<Polishing Particle>

The average particle diameter (d) of the silica-based polishing particle according to the present invention is 5 to 300 nm, and can be appropriately set in accordance with a required polishing rate, polishing precision, and so on. The average particle diameter (d) is determined as follows: an electron micrograph is taken and 100 particles are arbitrarily selected therefrom; the longest diameter of the primary particle(s) is measured for each of the 100 particles as illustrated in FIG. 1; and the average value is used as the average particle diameter (d).

When the average particle diameter is smaller than 5 nm, a dispersion of the silica-based particle tends to have insufficient stability, and the particle diameter is too small to achieve a sufficient polishing rate. In addition, since the surface area is large, "particle residues" are likely to be left on a substrate after polishing. When the average particle diameter is larger than 300 nm, scratches may be generated to cause insufficient smoothness, although depending on the types of substrate or insulating film. The average particle diameter is preferably 10 to 200 nm, and more preferably 15 to 100 nm.

The aspect ratio of the silica-based polishing particle according to the present invention is 1.00 or more and 1.20 or less.

The aspect ratio is determined as follows: particles are observed under a scanning electron microscope; the longest side of a rectangle enclosing a particle or particles is defined as the side (b) as illustrated in FIG. 2 and the vertical-to-horizontal ratio is measured for 100 particles; and the average value is used as the aspect ratio. A particle with an aspect ratio within the above range has a true spherical shape or generally spherical shape. In addition, no convex portion is present in the surface of a particle with an aspect ratio within the above range, and as a result, points of stress concentration are dispersed in polishing, which facilitates production of a substrate with high surface accuracy (low profile irregularity) (i.e., being flat).

Here, when the aspect ratio is higher than 1.20, the particle is likely to aggregate or have an irregular or rectangular shape, and homogeneous polishing cannot be achieved, and scratches such as scars and lines may be generated to result in a polished surface with insufficient smoothness.

The primary particles of the silica-based polishing particle according to the present invention form a three-dimensional polycondensation structure. This is due to the fact that hydrolysis and polycondensation of alkoxysilane occurring in an alkaline environment proceed not only in a planar state (in a two-dimensional manner) but also in a cubic manner (in a three-dimensional manner). An abrasive using a particle having such a structure is suitable because it has a high particle dispersibility and provides a sufficient polishing rate. On the other hand, hydrolysis and polycondensation of alkoxysilane occurring in an acidic environment proceed in a two-dimensional manner, and hence a spherical particle cannot be obtained.

The structure can be determined by the presence of a particle observed with a transmission electron microscope or a scanning electron microscope.

The silica-based polishing particle according to the present invention is a silica-based particle containing an alkoxy group. The content of carbon derived from the alkoxy group in the silica-based polishing particle is 0.005% by mass or more and less than 0.50% by mass. An abrasive using a silica-based polishing particle with a carbon content within this range can provide a substrate which has less particle attachment and from which the particles can be easily washed out (with fewer "particle residues"). In addition, a silica-based polishing particle meeting the requirements of the present invention for the average particle diameter and aspect ratio and having a carbon content in the above range provides a high surface accuracy (high smoothness).

Although this mechanism has not yet been identified, the reason why "particle residues" were frequently observed in conventional polishing is probably that an acid or alkali added during preparation of a polishing slurry (abrasive) excessively hydrolyzes alkoxy residues in a silica-based polishing particle as described above, resulting in increased formation of active —OH groups. In the case of the present invention, in contrast, the carbon content of the silica-based polishing particle is within the range of 0.005% by mass or more and less than 0.50% by mass, and the amount of formation of —OH groups by hydrolysis of alkoxy residues is quite small, which weakens the interaction with a substrate and thus a substrate with a smaller amount of particle attachment (fewer "particle residues") can be obtained.

Here, when the carbon content is 0.50% by mass or more, a sufficient polishing rate cannot be achieved because the number of alkoxy residues becomes large, and more particle attachment is further caused after polishing. Thus, such a carbon content is not preferred.

When the carbon content is less than 0.005% by mass, on the other hand, the number of alkoxy residues as carbon source is small, and formation of siloxane bonds proceeds. As a result, the particle becomes very hard and provides a high polishing rate. However, scratches are generated to result in a polished surface with insufficient smoothness, even if the other conditions are adjusted. In addition, the stability in mixing the silica-based particle with other materials is lowered, which causes aggregation in formation of a polishing slurry and scratches may be generated in polishing. Thus, further reduction in the carbon content to below 0.005% by mass to raise the purity of the silica-based particle may only result in insufficient performance as an abrasive.

The carbon content is more preferably 0.01% by mass or more and less than 0.30% by mass, and even more preferably 0.01% by mass or more and less than 0.20% by mass.

It is preferred that, in the silica-based polishing particle according to the present invention, the content of each of alkali metals, alkali earth metals, Fe, Ti, Zn, Pd, Ag, Mn, Co, Mo, Sn, Al, and Zr is less than 0.1 ppm, the content of each of Cu, Ni, and Cr is less than 1 ppb, and the content of each of U and Th is less than 0.3 ppb.

When the metal elements as impurity components are present in quantities larger than the above-mentioned ranges, the metal elements may remain on a substrate polished with the silica-based particle, and cause insulation failure to a circuit formed on a semiconductor substrate or short the circuit to decrease the dielectric constant of a film for insulation (insulating film) and increase the impedance of the metal wiring, leading to lowering of the response speed, increase of the power consumption, and so on. In addition, the metal element ions may migrate (diffuse), and the failures may be caused under some conditions for use or after a long-term use. In particular, U and Th generate radiation to cause malfunctions to a semiconductor device even when the amount of remaining U or Th is minute. Thus, the U or Th content higher than the above range is not preferred.

Here, the alkali metal refers to Li, Na, K, Rb, Cs, or Fr. The alkali earth metal refers to Be, Mg, Ca, Sr, Ba, or Ra.

To obtain such a highly-pure silica-based particle with a small content of impurity components, it is preferred to use an apparatus the material of which is free of such elements and has high chemical resistance in preparation of the particle. Specific preferred examples of the material include plastics such as Teflon (R), FRP, and carbon fibers, and non-alkali glass.

In addition, it is preferred to purify raw materials to be used by distillation, ion exchange, or removal with a filter. In particular, alcohol used in hydrolysis of alkoxide, may be contaminated with metal impurity components from a tank and so on or with a catalyst in synthesis, and may require purification at a particularly high level.

To obtain a highly-pure silica-based particle, raw materials with a small content of impurity components are prepared in advance and contamination from an apparatus for particle preparation is prevented, as described above. As another method, a reduction in impurity components can be performed for a particle prepared without taking such countermeasures sufficiently. However, impurity components are incorporated in the silica particle, and this situation makes purification by using ion exchange or removal with a filter inefficient, and high cost may be required. Thus, use of such a method is not practical for obtaining a silica-based particle with a small content of impurity components.

It is preferred that, in the silica-based polishing particle according to the present invention, the ratio ($\gamma/d$) of the dynamic light scattering particle diameter ($\gamma$) to the average particle diameter (d) is 1.00 or more and 1.50 or less. The average particle diameter measured in accordance with a dynamic light scattering method, namely, the dynamic light scattering particle diameter ($\gamma$) can be determined by using a measuring apparatus the principle of measurement of which is based on a dynamic light scattering method. Silica-based particles with a ratio ($\gamma/d$) within this range have a small degree of aggregation, and hence advantageously provide a high polishing rate in polishing and high smoothness, and leave fewer "particle residues" on a substrate.

It is preferred that, in the silica-based polishing particle according to the present invention, the ratio ($\gamma^1/d$) of the equivalent spherical particle diameter ($\gamma^1$) calculated from the specific surface area (SA) in accordance with a nitrogen adsorption method (BET method) to the average particle diameter (d) is 0.80 or more and less than 1.00. Determination of the equivalent spherical particle diameter ($\gamma^1$) by using a BET method is as follows: the specific surface area is calculated from the amount of adsorption of nitrogen by using a BET single-point method; and the equivalent spherical particle diameter ($\gamma^1$) is calculated with the density of silica defined as 2.2 by using the equation "equivalent spherical particle diameter ($\sqrt[3]{}^1$)=6000/(SA×density)."

When the ratio ($\gamma^1/d$) is within the above range, the equivalent spherical particle diameter ($\gamma^1$) is smaller than the apparent particle size (average particle diameter, d), and hence the particle is porous. Accordingly, the particle is not hard even though the elasticity of the particle itself is poor, and thus a substrate with higher smoothness can be obtained in polishing.

A ratio ($\gamma^1/d$) of 1.00 indicates that the inside of the particle is filled (solid), and it may be difficult to obtain a substrate with high smoothness in polishing when the elasticity of the particle itself is poor. When the ratio ($\gamma^1/d$) is less than 0.80, the particle is hollow and fragile, which may result in insufficient polishing.

<Production of Silica-Based Polishing Particle>

The method for producing the silica-based polishing particle according to the present invention may be any method capable of providing the above-described particle, without any limitation.

As a method for reducing the content of impurity components such as alkali metals or the content of carbon component derived from alkoxy residues, the silica particle disclosed in Japanese Patent Laid-Open No. 2003-213249 in which the carbon content of alkoxy residues derived from alkoxide is 0.5 to 5% by mass can be further washed with an ultrafiltration membrane or the like, or subjected to hydrothermal treatment with an autoclave or the like, or calcined and crushed. These methods can be also used in combination.

A specific example of the method for producing the silica-based polishing particle is exemplified as follows.

The silica-based polishing particle can be obtained by hydrolysis of one or more of alkoxysilanes represented by the following formula [1], followed by hydrothermal treatment at a temperature of 300° C. or less, as necessary.

$$X_nSi(OR)_{4-n} \qquad [1]$$

In the formula, X represents a hydrogen atom, a fluorine atom, an alkyl group having 1 to 8 carbon atoms, an aryl group, or a vinyl group; R represents a hydrogen atom, an alkyl group having 1 to 8 carbon atoms, an aryl group, or a vinyl group; and n is an integer of 0 to 3.

Among these alkoxysilanes, use of an alkoxysilane with short alkyl chains such as tetramethoxysilane (TMOS) and tetraethoxysilane (TEOS) is particularly preferred. This is because the hydrolysis rate is high when the alkoxysilane is used, and a silica particle with a small carbon content can be easily obtained.

Hydrolysis of alkoxysilane is performed in the presence of water, an organic solvent, and a catalyst. It is desirable that the quantity of water required for this hydrolysis is 0.5 to 50 mol, preferably 1 to 25 mol, per mol of Si—OR group constituting the alkoxysilane. When the quantity of water is less than 0.5 mol, a particle having an aspect ratio of over 1.20 or a solid particle which the ratio ($\gamma^1/d$) of the equivalent spherical particle diameter ($\gamma^1$) calculated from the specific surface area in accordance with a BET method to the average particle diameter (d) is 1.00 may be formed.

It is desirable to add a catalyst in a quantity of 0.005 to 1 mol, preferably 0.01 to 0.8 mol, per mol of alkoxysilane. When the quantity of the catalyst is less than 0.005 mol, the progression of hydrolysis is slow, and a particle having a wide particle size distribution may be formed. When the quantity of the catalyst is over 1 mol, the hydrolysis speed is significantly high, and thus it is difficult to obtain a particle, and a gel may be formed.

Hydrolysis of the alkoxysilane is typically performed under normal pressure at a temperature equal to or lower than the boiling point of a solvent to be used, preferably at a temperature lower than the boiling point of a solvent to be used by about 5 to 10° C. In case that a heat/pressure-resistant container such as an autoclave is used, hydrolysis can be performed at a temperature higher than the above-mentioned temperature.

When hydrolysis is performed under the above conditions, polycondensation of the alkoxysilane proceeds in a three-dimensional manner to afford a silica-based polishing particle having an average particle diameter of 5 to 300 nm. When hydrolysis of the alkoxysilane is again performed in the presence of the obtained particle, a silica-based polishing particle having a larger size or a more homogeneous particle diameter distribution can be obtained.

As necessary, the generated silica-based particle can be further subjected to (1) washing, (2) hydrothermal treatment at a temperature of 300° C. or lower, or (3) calcination followed by crushing. The carbon content can be reduced to a desired carbon content by performing any one of these treatments or any combination of these treatments.

The washing agent to be used in the washing can be any washing agent capable of dissolving the alkoxysilane therein, and an alcohol is especially preferred. Since alkoxide has high solubility in alcohols, even unreacted alkoxide in the inside of the particle can be removed through washing with an alcohol, although depending on washing conditions. For this reason, use of an alcohol makes it easy to obtain a silica-based polishing particle in which the ratio ($\gamma^1/d$) of the equivalent spherical particle diameter ($\gamma^1$) calculated from the specific surface area (SA) in accordance with a BET method to the average particle diameter (d) is 0.80 or more and less than 1.00. When washing is performed with water, in which alkoxide has a low solubility, on the other hand, alkoxide on the surface of the particle is easily washed out, and thus a silica-based polishing particle in which the ratio ($\gamma^1/d$) is 1.00 is likely to be formed. In addition, washing with water may result in a large ratio ($\gamma^1/d$) for some unclear reason. Although the reason has not been identified yet, it is estimated that the amount of alkoxide on the surface of the particle has some influence.

In the case that the concentration of coexisting ammonia or the like is low or in the case of an acidic environment, not a monodisperse particle but a short fiber-shaped silica-based particle, in which several or more particles are two-dimensionally linked, may formed when the temperature in the hydrothermal treatment exceeds 150° C., in particular, 250° C. In this case, aggregation such that the ratio ($\gamma/d$) of the dynamic light scattering particle diameter ($\gamma$) to the average particle diameter (d) exceeds 1.50 may be caused. Use of such a short fiber-shaped silica-based particle or aggregated silica-based particle as an abrasive is not preferred because scratches may be generated.

For this reason, the temperature in the hydrothermal treatment is preferably 100 to 300° C., more preferably 100 to 250° C., and even more preferably 100 to 150° C.

In addition, the pH in the hydrothermal treatment is preferably 9 to 11. The silica-based particle maintains high dispersibility and silica has a high solubility within this pH range, and hence Ostwald ripening homogeneously occurs and a spherical silica-based particle having an aspect ratio of 1.00 or more and 1.20 or less is likely to be obtained.

When the pH is 8 or lower, the dispersibility of the silica-based particle is low and the solubility of the silica-based particle is also low, and hence an aggregated particle is to be subjected to hydrothermal treatment. Thus, an irregularly-shaped particle is likely to be formed to provide a silica-based particle having an aspect ratio of higher than 1.20. Accordingly, such pH is not preferred.

In the case that hydrothermal treatment is not performed, a highly porous particle is likely to be formed, and hence a silica-based particle in which the ratio ($\gamma^1$/d) of the equivalent spherical particle diameter ($\gamma^1$) calculated from the specific surface area (SA) in accordance with a BET method to the average particle diameter (d) is less than 0.80 may be formed.

In the case that calcination and crushing are performed, the calcination temperature is preferably 200° C. to 600° C. When the calcination temperature is lower than 200° C., unreacted alkoxide does not react, and a particle having a carbon content of 0.50% by mass or more may be formed. When the calcination temperature is higher than 600° C., in contrast, alkoxide is decomposed, and a particle having a carbon content of less than 0.005% by mass may be formed. Even when a particle having a carbon content of 0.005% by mass or more is obtained at this calcination temperature, interparticle attachment may be caused to prevent formation of a spherical particle even after crushing. A conventionally known crushing method can be used for crushing, and a crushing method with a bead mill is preferred.

Examples of the organic solvent include alcohols, ketones, ethers, and esters. More specifically, alcohols such as methanol, ethanol, propanol, and butanol, ketones such as methyl ethyl ketone and methyl isobutyl ketone, glycol ethers such as methyl cellosolve, ethyl cellosolve, and propylene glycol monopropyl ether, glycols such as ethylene glycol, propylene glycol, and hexylene glycol, or esters such as methyl acetate, ethyl acetate, methyl lactate, and ethyl lactate are used.

For the catalyst, a basic compound is used, such as ammonia, an amine, an alkali metal hydride, a quaternary ammonium compound, and an amine coupling agent. Although an alkali metal hydride can be used as the catalyst, an alkali metal hydride accelerates hydrolysis of the alkoxy group in the alkoxysilane to reduce the number of alkoxy groups (carbon) remaining in the resulting particle, and hence scratches may be generated, even though a high polishing rate is achieved, and, in addition, a content of alkali metal elements may increase.

Examples of the alkoxysilane represented by the formula [1] other than tetramethoxysilane and tetraethoxysilane include tetraisopropoxysilane, tetrabutoxysilane, tetraoctylsilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyitriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trifluoromethyltrimethoxysilane, and trifluoromethyltriethoxysilane.

To obtain a silica-based polishing particle having a small carbon content, it is required to remove the carbon component derived from the alkoxy group in the alkoxysilane in particle preparation. Examples of the method for removing the carbon component include washing with water, washing with alcohol, and hydrothermal treatment for removal of the carbon component through acceleration of hydrolysis. These methods may be performed alone or in combination. Removal of the carbon component is easier for silane alkoxide having a structure of shorter carbon chains, and tetramethoxysilane and tetraethoxysilane are preferred among the above silane alkoxides. In particular, in the case of tetramethoxysilane, having a shortest carbon chain, the carbon component can be removed by simple washing with water.

<Abrasive>

The abrasive according to the present invention is obtained by dispersing the above-described silica-based polishing particle in a dispersion medium.

Although water is typically used for the dispersion medium, alcohols such as methyl alcohol, ethyl alcohol, and isopropyl alcohol can be used, as necessary, and a water-soluble organic solvent such as ethers, esters, and ketones can be also used.

The concentration of the silica-based polishing particle in the abrasive is preferably 2 to 50% by mass, and more preferably 5 to 30% by mass. When the concentration is less than 2% by mass, the concentration is too low for some types of substrates or insulating films and a low rate decreases, which may disadvantageously lead to poor productivity. When the concentration of the silica-based particle is more than 50% by mass, the stability of the abrasive is insufficient, and further improvement in the polishing rate or polishing efficiency is not achieved. In addition, formation and attachment of a dried product may occur during a process of feeding a dispersion for polishing, which may cause generation of scratches.

The abrasive according to the present invention can be used with addition of conventionally known hydrogen peroxide, peracetic acid, urea peroxide, or a mixture thereof, as necessary, though the substance to be added depends on the type of an object to be polished. Use of the abrasive with addition of hydrogen peroxide or the like can effectively improve the polishing rate in the case that the object to be polished is made of metal.

In addition, the abrasive according to the present invention can be used with addition of an acid such as sulfuric acid, nitric acid, phosphoric acid, and hydrofluoric acid, or a sodium salt, potassium salt, or ammonium salt of any of these acids, or a mixture thereof, as necessary. In this case, when an object consisting of a plurality of materials is polished, the polishing rate is increased or decreased in accordance with the material being polished in the object, and thereby a flat polished surface can be finally obtained. As other additives, for example, imidazole, benzotriazole, or benzothiazole can be used so that a passive layer or a dissolution-preventing layer is formed on the surface of a metal object to be polished in order to prevent erosion of a substrate.

To spread the passive layer, a complexing agent can be used, such as an organic acid such as citric acid, lactic acid, acetic acid, oxalic acid, and phthalic acid, and a salt of any of these organic acids.

To improve the dispersibility and stability of a slurry of the abrasive, a cationic, anionic, nonionic, or amphoteric surfactant can be appropriately selected and added.

Further, to enhance the effects of the above additives, an acid or base can be added, as necessary, to control the pH of a slurry of the abrasive.

The silica-based polishing particle and the abrasive including the silica-based polishing particle according to the present invention provide a high polishing rate and do not cause generation of scratches, and thus can polish the surface of a substrate into an extremely flat and smooth surface. The silica-based particle leaves fewer "particle residues" on a substrate by virtue of the small carbon content. In addition, since the silica-based particle is substantially free of metal element components including sodium as impurity components, metal elements are not attached on the surface of a polished semiconductor substrate or oxide film, and hence the silica-based particle is particularly useful for flattening of a substrate, in particular, for formation of a metal wiring layer in a semiconductor integrated circuit, etc.

EXAMPLES

Hereinafter, the present invention will be described with reference to Examples. However, the present invention shall be not limited to these Examples.

Example 1

<Production of Silica-Based Polishing Particle (A)>

A mixed solvent of 139.1 g of pure water and 169.9 g of methanol (manufactured by Chusei Oil Co., Ltd. (the same applies hereinafter)) was held at 60° C., and thereto 2982.5 g of a water-methanol solution of tetraethoxysilane (manufactured by Tama Chemicals Co., Ltd., Ethyl Silicate 28, $SiO_2$=28% by mass (the same applies hereinafter)) (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 150° C. for 10 hours. Subsequently, the resultant was purified with an amphoteric ion exchange resin and concentrated with an ultrafiltration membrane to afford dispersion of a silica-based polishing particle (A) having a solid content concentration of 20% by mass.

The equipment used was one lined with Teflon (R) (the same applies hereinafter). The tetraethoxysilane, methanol, and ammonia used had been subjected to distillation to reduce impurity components including sodium, which are listed in Table 2, to a concentration of less than 0.01 ppb (the same applies hereinafter). The average particle diameter, aspect ratio, dynamic light scattering particle diameter, equivalent spherical particle diameter, presence or absence of an alkoxy group, carbon content, and content of metal elements including sodium as impurity components were determined for the silica-based polishing particle (A), and the results are shown in Table 1 and Table 2 (the same applies hereinafter).

<<Measurement of Average Particle Diameter>>

The average particle diameter (d) was determined as follows: an electron micrograph of a silica-based particle was taken and 100 particles were arbitrarily selected therefrom; the longest diameter of the primary particle(s) was measured for each of the 100 particles as illustrated in FIG. 1; and the average value was used as the average particle diameter (d).

<<Measurement of Aspect Ratio>>

The aspect ratio was determined as follows: an electron micrograph of a silica-based particle was taken; the longest side of a rectangle enclosing a particle or particles was defined as the side (b) as illustrated in FIG. 2 and the vertical-to-horizontal ratio was measured for 100 particles arbitrarily selected; and the average value was used as the aspect ratio.

<<Measurement of Alkoxy Group>>

A dispersion of a silica-based particle was dried at 150° C., and subjected to measurement with a Fourier transform infrared spectrometer (manufactured by JASCO Corporation, model: FT/IR-6100) to determine the presence or absence of an alkoxy group (—OR group) in the silica-based particle.

<<Measurement of Carbon Content>>

A dispersion of a silica-based particle was dried at 150° C., and subjected to measurement with a carbon/sulfur analyzer (manufactured by HORIBA, Ltd., EMIA-320V) to determine the carbon content of the silica-based particle.

<<Measurement of Contents of Metal Elements>>

The silica-based particle according to the present invention was dissolved in hydrofluoric acid, and heated to remove the hydrofluoric acid, and then pure water was added thereto, as necessary, and the resulting solution was subjected to measurement with an inductively coupled plasma (ICP) emission mass spectrometer (manufactured by Shimadzu Corporation, ICPM-8500) to determine the contents of alkali metals, alkali earth metals, Fe, Ti, Zn, Pd, Ag, Mn, Co, Mo, Sn, Al, and Zr, the contents of Cu, Ni, and Cr, and the contents of U and Th in the silica-based particle.

<<Measurement of Dynamic Light Scattering Particle Diameter>>

Measurement was performed with a dynamic light scattering particle size distribution analyzer (manufactured by Otsuka Electronics Co., Ltd., PAR-III), and the cumulant particle diameter was used as the dynamic light scattering particle diameter (γ).

<<Measurement of Equivalent Spherical Particle Diameter>>

A dispersion of a silica-based particle was dried at 150° C., and subjected to a BET method with a specific surface area analyzer (manufactured by Mountech Co., Ltd., Macsorb-1200) to determine the equivalent spherical particle diameter ($\gamma^1$). Specifically, the specific surface area (SA) was calculated from the amount of adsorption of nitrogen by using a BET single-point method, and the equivalent spherical particle diameter ($\gamma^1$) was calculated with the density of silica defined as 2.2 by using the equation "equivalent spherical particle diameter ($\gamma^1$)=6000/(SA×density)."

<Production of Abrasive (A)>

In 500 g of the dispersion of the silica-based polishing particle (A), 333 g of hydrogen peroxide solution having a concentration of 30% by mass, 5 g of ammonium oxalate, and 162 g of water were mixed to produce an abrasive (A) having a particle concentration of 10% by mass and containing 10% by mass of hydrogen peroxide and 0.5% by mass of ammonium oxalate. The solution produced was semitransparent.

<Substrate for Polishing>

A positive photoresist was applied onto a silicon wafer (8 inch wafer) substrate on which an insulating film consisting of silicon nitride (thickness: 0.2 µm), an insulating film consisting of silica (thickness: 0.4 µm), and an insulating film consisting of silicon nitride (thickness: 0.2 µm) were sequentially laminated, and the substrate was subjected to exposure treatment with a line-and-space pattern at an interval of 0.3 µm. Subsequently, the exposed portion was removed with a developing solution of tetramethylammonium halide (TMAH). Next, a pattern was formed on the lower insulating film with mixed gas of $CF_4$ and $CHF_3$, and the resist was then removed with $O_2$ plasma to form a wiring groove having a width (WC) of 0.3 µm and a depth of 0.6 µm. Film formation was performed to form a thin film of copper (Cu) on the substrate with the wiring groove formed thereon by using a CVD method, and film formation was further performed by using an electroplating method so that the total thickness of the copper layer (sacrifice layer) on the insulating film reached 0.2 µm, and thus a substrate for polishing was prepared.

<<Polishing Test>>

The substrate for polishing was set in a polishing machine (manufactured by Nano Factor Co., Ltd., NF300), and polished with a load of 5 psi applied to the substrate at a table rotation speed of 50 rpm and a spindle speed of 60 rpm while the abrasive (A) was fed at a rate of 60 mL/min until the sacrifice layer on the insulating film (thickness: 0.2 µm) disappeared. The time required for the polishing was 80 seconds. The polishing rates are shown in Table 3. Thereafter, the substrate was washed with pure water and air-dried. The polished surface of the resulting polished substrate was observed, and the smoothness of the surface was evaluated by using the criteria below. The results are shown in Table 3.

No scratch was found: Very good

A few small scratches were found: Good

Small scratches were found over a wide area: Fair

Large scratches were found in a scattered manner: Poor

Large scratches were found over a wide area: Very poor

The number of "particle residues" on the polished substrate was counted by using a laser microscope (manufactured by KEYENCE CORPORATION, VK-X250), and evaluated by using the criteria below. The results are shown in Table 3.

0 "particle residue": Very good 1 to 10 "particle residues": Good 11 to 50 "particle residues": Fair 51 to 100 "particle residues": Poor 101 or more "particle residues": Very poor <Total Rating>

In view of the result of the polishing test and use of the abrasive for highly-integrated semiconductor circuits, the performance as an abrasive was totally determined. The rating results are classified as below. The results are shown in Table 3.

Very suitable as an abrasive: Very good

Suitable as an abrasive: Good

Acceptable as an abrasive: Fair

Unsuitable as an abrasive: Poor

Very unsuitable as an abrasive: Very poor

Example 2

<Production of Silica-Based Polishing Particle (B), Production of Abrasive (B), and Polishing Test>

A mixed solvent of 139.1 g of pure water and 169.9 g of methanol was held at 10° C., and thereto 2503.25 g of a water-methanol solution of tetraethoxysilane (obtained by dissolving 53.25 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.0034) were simultaneously added over 10 seconds. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 100° C. for 10 hours. Subsequently, the resultant was purified with an amphoteric ion exchange resin and concentrated with an ultrafiltration membrane to afford a dispersion of a silica-based polishing particle (B) having a solid content concentration of 20% by mass.

An abrasive (B) was produced in the same manner as in Example 1 except that the silica-based polishing particle (B) was used, and a polishing test was conducted in the same manner as in Example 1.

Example 3

<Production of Silica-Based Polishing Particle (C), Production of Abrasive (C), and Polishing Test>

A mixed solvent of 139.1 g of pure water and 169.9 g of methanol was held at 40° C., to which a silica-based polishing particle as a seed particle was added to a concentration of 1% by mass, and thereto 2982.5 g of a water-methanol solution of tetraethoxysilane (obtained by dissolving 532.5 g of tetraethoxysilane in 2450 g of a water/methanol (mass ratio: 0.5/9.5) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 200° C. for 20 hours. Subsequently, the resultant was purified with an amphoteric ion exchange resin and concentrated with an ultrafiltration membrane to afford a dispersion of a silica-based polishing particle (C) having a solid content concentration of 20% by mass.

An abrasive (C) was produced in the same manner as in Example 1 except that the silica-based polishing particle (C) was used, and a polishing test was conducted in the same manner as in Example 1.

Example 4

<Production of Silica-Based Polishing Particle (D), Production of Abrasive (D), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 200° C. for 20 hours. Subsequently, the resultant was purified with an amphoteric ion exchange resin and concentrated with an ultrafiltration membrane to afford a dispersion of a silica-based polishing particle (D) having a solid content concentration of 20% by mass.

An abrasive (D) was produced in the same manner as in Example 1 except that the silica-based polishing particle (D) was used, and a polishing test was conducted in the same manner as in Example 1.

Example 5

<Production of Silica-Based Polishing Particle (E), Production of Abrasive (E), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 120° C. for 20 hours. Subsequently, the resultant was purified with an amphoteric ion exchange resin and concentrated with an ultrafiltration membrane to afford a dispersion of a silica-based polishing particle (E) having a solid content concentration of 20% by mass.

An abrasive (E) was produced in the same manner as in Example 1 except that the silica-based polishing particle (E) was used, and a polishing test was conducted in the same manner as in Example 1.

Example 6

<Production of Silica-Based Polishing Particle (F), Production of Abrasive (F), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 100° C. for 20 hours. Subsequently, the resultant was purified with an amphoteric ion exchange resin and concentrated with an ultrafiltration membrane to afford a dispersion of a silica-based polishing particle (F) having a solid content concentration of 20% by mass.

An abrasive (F) was produced in the same manner as in Example 1 except that the silica-based polishing particle (F) was used, and a polishing test was conducted in the same manner as in Example 1.

Example 7

<Production of Silica-Based Polishing Particle (G), Production of Abrasive (G), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 150° C. for 10 hours. Subsequently, the resultant was purified with an amphoteric ion exchange resin and concentrated with an ultrafiltration membrane to afford a dispersion of a silica-based polishing particle (G) having a solid content concentration of 20% by mass.

An abrasive (G) was produced in the same manner as in Example 1 except that the silica-based polishing particle (G) was used, and a polishing test was conducted in the same manner as in Example 1.

Example 8

<Production of Silica-Based Polishing Particle (H), Production of Abrasive (H), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, and alkoxide in the particle was further removed by washing with methanol through an ultrafiltration membrane, and then replacement with water was performed by using pure water through an ultrafiltration membrane. Thereafter, the pH was adjusted to 11 with aqueous ammonia, and aging was performed in an autoclave at 100° C. for 3 hours. Subsequently, the resultant was purified with an amphoteric ion exchange resin and concentrated with an ultrafiltration membrane to afford a dispersion of a silica-based polishing particle (H) having a solid content concentration of 20% by mass.

An abrasive (H) was produced in the same manner as in Example 1 except that the silica-based polishing particle (H) was used, and a polishing test was conducted in the same manner as in Example 1.

Example 9

<Production of Silica-Based Polishing Particle (I), Production of Abrasive (I), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane. After the pH reached 7, alkoxide was further removed by washing with 10 kg of pure water through an ultrafiltration membrane. Thereafter, the pH was adjusted to 11 with aqueous ammonia, and aging was performed in an autoclave at 150° C. for 3 hours. Subsequently, the resultant was purified with an amphoteric ion exchange resin and concentrated with an ultrafiltration membrane to afford a dispersion of a silica-based polishing particle (I) having a solid content concentration of 20% by mass.

An abrasive (I) was produced in the same manner as in Example 1 except that the silica-based polishing particle (I) was used, and a polishing test was conducted in the same manner as in Example 1.

Example 10

<Production of Silica-Based Polishing Particle (J), Production of Abrasive (J), and Polishing Test>

A mixed solvent of 139.1 g of pure water and 169.9 g of methanol was held at 40° C., and thereto 2837.3 g of a water-methanol solution of tetramethoxysilane (obtained by dissolving 387.3 g of tetramethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was performed for 3 hours. Thereafter, unreacted tetramethoxysilane, methanol, and ammonia were almost completely removed with pure water through an ultrafiltration membrane, the pH was adjusted to 11 with aqueous ammonia, and aging was performed at 80° C. for 3 hours. Subsequently, the resultant was purified with an amphoteric ion exchange resin and concentrated with an ultrafiltration membrane to afford a dispersion of a silica-based polishing particle (J) having a solid content concentration of 20% by mass.

An abrasive (J) was produced in the same manner as in Example 1 except that the silica-based polishing particle (J) was used, and a polishing test was conducted in the same manner as in Example 1.

The tetramethoxysilane used had been subjected to distillation to reduce impurity components including sodium, which are listed in Table 2, to a concentration of less than 0.01 ppb.

Example 11

<Production of Silica-Based Polishing Particle (K), Production of Abrasive (K), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 3 with hydrochloric acid, and aging was performed in an autoclave at 150° C. for 20 hours. Subsequently, the resultant was purified with an amphoteric ion exchange resin and concentrated with an ultrafiltration membrane to afford a dispersion of a silica-based polishing particle (K) having a solid content concentration of 20% by mass.

An abrasive (K) was produced in the same manner as in Example 1 except that the silica-based polishing particle (K) was used, and a polishing test was conducted in the same manner as in Example 1.

Example 12

<Production of Silica-Based Polishing Particle (L), Production of Abrasive (L), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 150° C. for 10 hours. Subsequently, the resultant was purified with an amphoteric ion exchange resin and concentrated with an ultrafiltration membrane to afford a dispersion of a silica-based polishing particle (L) having a solid content concentration of 20% by mass.

An abrasive (L) was produced in the same manner as in Example 1 except that the silica-based polishing particle (L) was used, and a polishing test was conducted in the same manner as in Example 1.

Example 13

<Production of Silica-Based Polishing Particle (M), Production of Abrasive (M), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, and alkoxide in the particle was further removed by washing with methanol through an ultrafiltration membrane, and then replacement with water was performed by using pure water through an ultrafiltration membrane. Subsequently, the resultant was purified with an amphoteric ion exchange resin and concentrated with an ultrafiltration membrane to afford a dispersion of a silica-based polishing particle (M) having a solid content concentration of 20% by mass.

An abrasive (M) was produced in the same manner as in Example 1 except that the silica-based polishing particle (M) was used, and a polishing test was conducted in the same manner as in Example 1.

Example 14

<Production of Silica-Based Polishing Particle (N), Production of Abrasive (N), and Polishing Test>

A mixed solvent of 139.1 g of pure water and 169.9 g of methanol was held at 60° C., and thereto 13259.7 g of a water-methanol solution of tetraethoxysilane (obtained by dissolving 10809.70 g of tetraethoxysilane in 2450 g of a water/methanol (mass ratio: 2/8) mixed solvent) and 12106.9 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, and alkoxide in the particle was further removed by washing with methanol through an ultrafiltration membrane, and then replacement with water was performed by using pure water through an ultrafiltration membrane. Thereafter, the pH was adjusted to 11 with aqueous ammonia, and aging was performed in an autoclave at 100° C. for 3 hours. Subsequently, the resultant was purified with an amphoteric ion exchange resin and concentrated with an ultrafiltration membrane to afford a dispersion of a silica-based polishing particle (N) having a solid content concentration of 20% by mass.

An abrasive (N) was produced in the same manner as in Example 1 except that the silica-based polishing particle (N) was used, and a polishing test was conducted in the same manner as in Example 1.

Comparative Example 1

<Production of Silica-Based Polishing Particle (RF-A), Production of Abrasive (RF-A), and Polishing Test>

A mixed solvent of 139.1 g of pure water and 169.9 g of methanol was held at 10° C., and thereto 2503.25 g of a water-methanol solution of tetraethoxysilane (obtained by dissolving 53.25 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.0034) were added over 1 second. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 100° C. for 10 hours. Subsequently, the resultant was purified with an amphoteric ion exchange resin and concentrated with an ultrafiltration membrane to afford a dispersion of a silica-based polishing particle (RF-A) having a solid content concentration of 20% by mass.

An abrasive (RF-A) was produced in the same manner as in Example 1 except that the silica-based polishing particle (RF-A) was used, and a polishing test was conducted in the same manner as in Example 1.

Comparative Example 2

<Production of Silica-Based Polishing Particle (RF-B), Production of Abrasive (RF-B), and Polishing Test>

A mixed solvent of 139.1 g of pure water and 169.9 g of methanol was held at 40° C., to which a silica-based polishing particle as a seed particle was added to a concentration of 0.5% by mass, and thereto 2982.5 g of a water-methanol solution of tetraethoxysilane (obtained by dissolving 532.5 g of tetraethoxysilane in 2450 g of a water/methanol (mass ratio: 0.5/9.5) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 11 with aqueous ammonia, and aging was performed in an autoclave at 200° C. for 20 hours. Subsequently, the resultant was purified with an amphoteric ion exchange resin and concentrated with an ultrafiltration membrane to afford a dispersion of a silica-based polishing particle (RF-B) having a solid content concentration of 20% by mass.

An abrasive (RF-B) was produced in the same manner as in Example 1 except that the silica-based polishing particle (RF-B) was used, and a polishing test was conducted in the same manner as in Example 1.

Comparative Example 3

<Production of Silica-Based Polishing Particle (RF-C), Production of Abrasive (RF-C), and Polishing Test>

The dispersion of the silica-based polishing particle (A) obtained in Example 1 was dried at 120° C., and crushed with an agate mortar and an agate pestle. Thereafter, the resultant was put in a quartz casing and calcined at 700° C. for 5 hours. Then, 30 g of the resulting silica powder was dispersed in 70 g of pure water, and the pH was adjusted to 11 with aqueous ammonia. Subsequently, the silica powder was crushed with quartz beads of $\phi$0.1 mm. Then, the beads were removed, and the resultant was subjected to ion exchange followed by filtration with a filter of 1 μm to afford a dispersion of a silica-based polishing particle (RF-C) having a solid content concentration of 20% by mass.

An abrasive (RF-C) was produced in the same manner as in Example 1 except that the silica-based polishing particle (RF-C) was used. The solution produced was cloudy. A polishing test was conducted for the abrasive (RF-C) in the same manner as in Example 1.

Comparative Example 4

<Production of Silica-Based Polishing Particle (RF-D), Production of Abrasive (RF-D), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed through an ultrafiltration membrane, the resultant was purified with an amphoteric ion exchange resin, and concentrated with an ultrafiltration membrane to afford a dispersion of a silica-based polishing particle (RF-D) having a solid content concentration of 20% by mass.

An abrasive (RF-D) was produced in the same manner as in Example 1 except that the silica-based polishing particle (RF-D) was used, and a polishing test was conducted in the same manner as in Example 1.

Comparative Example 5

<Production of Silica-Based Polishing Particle (RF-E), Production of Abrasive (RF-E), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, the pH was adjusted to 3 with hydrochloric acid, and aging was performed in an autoclave at 250° C. for 20 hours. Subsequently, the resultant was purified with an amphoteric ion exchange resin and concentrated with an ultrafiltration membrane to afford a dispersion of a silica-based polishing particle (RF-E) having a solid content concentration of 20% by mass.

An abrasive (RF-E) was produced in the same manner as in Example 1 except that the silica-based polishing particle (RF-E) was used, and a polishing test was conducted in the same manner as in Example 1.

Comparative Example 6

<Production of Silica-Based Polishing Particle (RF-F), Production of Abrasive (RF-F), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, and pure water was added thereto to adjust to 1% by mass.

Next, aging was performed in an autoclave at 220° C. for 10 hours. Subsequently, the resultant was purified with an amphoteric ion exchange resin and concentrated with an ultrafiltration membrane to afford a dispersion of a silica-based polishing particle (RF-F) having a solid content concentration of 20% by mass.

An abrasive (RF-F) was produced in the same manner as in Example 1 except that the silica-based polishing particle (RF-F) was used, and a polishing test was conducted in the same manner as in Example 1.

Comparative Example 7

<Production of Silica-Based Polishing Particle (RF-G)>

A dispersion of a silica-based polishing particle (RF-G) was obtained in the same manner as in Example 1 except that 0.25% hydrochloric acid was used instead of 0.25% aqueous ammonia. The silica-based polishing particle (RF-G) was observed through SEM, and no particulate matter was found.

Comparative Example 8

<Production of Silica-Based Polishing Particle (RF-H), Production of Abrasive (RF-H), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the temperature for 3 hours. Thereafter, unreacted tetraethoxysilane, methanol, and ammonia were almost completely removed with pure water through an ultrafiltration membrane, and pure water was added thereto to adjust to 1% by mass.

Next, aging was performed in an autoclave at 220° C. for 10 hours. Subsequently, the resultant was purified with an amphoteric ion exchange resin and then concentrated to 45%, which was a concentration immediately before gelling, with an ultrafiltration membrane, and diluted with pure water to afford a dispersion of a silica-based polishing particle (RF-H) having a solid content concentration of 20% by mass.

An abrasive (RF-H) was produced in the same manner as in Example 1 except that the silica-based polishing particle (RF-H) was used, and a polishing test was conducted in the same manner as in Example 1.

TABLE 1

| | | Silica particle | | | | | | | |
|---|---|---|---|---|---|---|---|---|---|
| | Alkoxy silane raw material | Average particle diameter d nm | Aspect ratio | Dynamic light scattering particle diameter γ nm | Equivalent spherical particle diameter $γ^1$ nm | Dynamic light scattering particle diameter/average particle diameter γ/d | Equivalent spherical particle diameter/average particle diameter $γ^1$/d | Alkoxy residue | Carbon content In terms of C % by mass |
| Example 1 | TEOS | 30 | 1.00 | 33 | 30 | 1.10 | 1.00 | presence | 0.10 |
| Example 2 | TEOS | 5 | 1.00 | 5 | 4.5 | 1.00 | 0.90 | presence | 0.10 |
| Example 3 | TEOS | 300 | 1.00 | 330 | 300 | 1.10 | 1.00 | presence | 0.20 |

TABLE 1-continued

| | | | | | | | Equivalent spherical | | |
| | | Average | | Dynamic light | Equivalent | Dynamic light | particle | | Carbon |
| | Alkoxy | particle | | scattering particle | spherical particle | scattering particle | diameter/average | | content |
| | silane | diameter | | diameter | diameter | diameter/average | particle diameter | Alkoxy | In terms of C |
| | raw | d | Aspect | γ | γ¹ | particle diameter | γ1/d | residue | % by mass |
| | material | nm | ratio | nm | nm | γ/d | | | |
|---|---|---|---|---|---|---|---|---|---|
| Example 4 | TEOS | 30 | 1.00 | 33 | 30 | 1.10 | 1.00 | presence | 0.01 |
| Example 5 | TEOS | 30 | 1.00 | 33 | 30 | 1.10 | 1.00 | presence | 0.20 |
| Example 6 | TEOS | 30 | 1.00 | 33 | 30 | 1.10 | 1.00 | presence | 0.40 |
| Example 7 | TEOS | 30 | 1.00 | 33 | 30 | 1.10 | 1.00 | presence | 0.40 |
| Example 8 | TEOS | 30 | 1.00 | 33 | 24 | 1.10 | 0.80 | presence | 0.10 |
| Example 9 | TEOS | 30 | 1.00 | 43 | 30 | 1.43 | 1.00 | presence | 0.20 |
| Example 10 | TEOS | 30 | 1.00 | 33 | 29 | 1.10 | 0.97 | presence | 0.10 |
| Example 11 | TEOS | 30 | 1.20 | 35 | 30 | 1.17 | 1.00 | presence | 0.10 |
| Example 12 | TEOS | 30 | 1.00 | 33 | 30 | 1.10 | 1.00 | presence | 0.20 |
| Example 13 | TEOS | 33 | 1.00 | 40 | 20 | 1.21 | 0.61 | presence | 0.40 |
| Example 14 | TEOS | 80 | 1.00 | 82 | 65 | 1.03 | 0.81 | presence | 0.10 |
| Comparative Example 1 | TEOS | 3 | 1.00 | 3 | 2 | 1.00 | 0.67 | presence | 0.10 |
| Comparative Example 2 | TEOS | 350 | 1.00 | 350 | 350 | 1.00 | 1.00 | presence | 0.10 |
| Comparative Example 3 | TEOS | 30 | 1.00 | 35 | 30 | 1.17 | 1.00 | absence | 0.00 |
| Comparative Example 4 | TEOS | 25 | 1.00 | 25 | 25 | 1.00 | 1.00 | presence | 1.10 |
| Comparative Example 5 | TEOS | 30 | 1.50 | 50 | 30 | 1.67 | 1.00 | presence | 0.10 |
| Comparative Example 6 | TEOS | 25 | 1.60 | 60 | 25 | 2.40 | 1.00 | presence | 0.30 |
| Comparative Example 7 | TEOS | | | | No particle obtained | | | | |
| Comparative Example 8 | TEOS | 25 | 1.60 | 80 | 25 | 3.20 | 1.00 | presence | 0.30 |

TABLE 2

| | Silica particle Contents of impurity components | | | | | | | | | | | | | |
| | Li | Na | K | Rb | Cs | Fr | Be | Mg | Ca | Sr | Ba | Ra | Fe | Ti |
| | | | | | | | ppm | | | | | | | |
|---|---|---|---|---|---|---|---|---|---|---|---|---|---|---|
| Example 1 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 2 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 3 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 4 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 5 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 6 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 7 | 0.000 | 0.050 | 0.010 | 0.000 | 0.000 | 0.000 | 0.000 | 0.010 | 0.020 | 0.000 | 0.000 | 0.000 | 0.010 | 0.000 |
| Example 8 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 9 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 10 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 11 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 12 | 0.000 | 1.100 | 0.010 | 0.000 | 0.000 | 0.000 | 0.000 | 0.010 | 0.020 | 0.000 | 0.000 | 0.000 | 0.010 | 0.000 |
| Example 13 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 14 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 1 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 2 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 3 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 4 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 5 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 6 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 7 | — | — | — | — | — | — | — | — | — | — | — | — | — | — |
| Comparative Example 8 | 0.000 | 0.500 | 0.010 | 0.000 | 0.000 | 0.000 | 0.000 | 0.010 | 0.050 | 0.000 | 0.000 | 0.000 | 0.010 | 0.000 |

TABLE 2-continued

| | Silica particle Contents of impurity components | | | | | | | | | | | | | |
|---|---|---|---|---|---|---|---|---|---|---|---|---|---|---|
| | Zn | Pd | Ag | Mn | Co ppm | Mo | Sn | Al | Zr | Cu | Ni ppb | Cr | U ppb | Th |
| Example 1 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 2 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 3 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 4 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 5 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 6 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 7 | 0.020 | 0.000 | 0.000 | 0.000 | 0.000 | 0.000 | 0.000 | 0.000 | 0.000 | 0.100 | 0.900 | 0.100 | 0.00 | 0.00 |
| Example 8 | 0.010 | 0.000 | 0.000 | 0.000 | 0.000 | 0.000 | 0.000 | 0.000 | 0.000 | 0.100 | 0.900 | 0.100 | 0.00 | 0.00 |
| Example 9 | 0.010 | 0.000 | 0.000 | 0.000 | 0.000 | 0.000 | 0.000 | 0.000 | 0.000 | 0.100 | 0.900 | 0.100 | 0.00 | 0.00 |
| Example 10 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 11 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 12 | 0.020 | 0.000 | 0.000 | 0.000 | 0.000 | 0.000 | 0.000 | 0.000 | 0.000 | 0.100 | 4.500 | 2.000 | 0.00 | 0.00 |
| Example 13 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 14 | 0.010 | 0.000 | 0.000 | 0.000 | 0.000 | 0.000 | 0.000 | 0.000 | 0.000 | 0.100 | 0.900 | 0.100 | 0.00 | 0.00 |
| Comparative Example 1 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 2 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 3 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 4 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 5 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 6 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 7 | — | — | — | — | — | — | — | — | — | — | — | — | — | — |
| Comparative Example 8 | 0.010 | 0.000 | 0.000 | 0.000 | 0.000 | 0.000 | 0.000 | 0.000 | 0.000 | 0.100 | 0.100 | 0.100 | 0.00 | 0.00 |

TABLE 3

| | Polishing test Polishing rate nm/min. | Smoothness | Particle residue | Remarks | Total rating |
|---|---|---|---|---|---|
| Example 1 | 150 | Good | Very good | Applicable to the most advanced highly-integrated semiconductor devices | Good |
| Example 2 | 100 | Very good | Very good | Applicable to the most advanced highly-integrated semiconductor devices | Good |
| Example 3 | 200 | Good | Good | Applicable to the most advanced highly-integrated semiconductor devices | Good |
| Example 4 | 170 | Good | Very good | Applicable to the most advanced highly-integrated semiconductor devices | Very good |
| Example 5 | 140 | Good | Good | Applicable to the most advanced highly-integrated semiconductor devices | Good |
| Example 6 | 135 | Good | Good | Applicable to the most advanced highly-integrated semiconductor devices | Good |
| Example 7 | 150 | Good | Good | Applicable to advanced highly-integrated semniconductor devices | Good |
| Example 8 | 140 | Very good | Very good | Applicable to the most advanced highly-integrated semiconductor devices | Very good |
| Example 9 | 145 | Good | Good | Applicable to the most advanced highly-integrated semiconductor devices | Good |
| Example 10 | 147 | Very good | Very good | Applicable to the most advanced highly-integrated semiconductor devices | Very good |
| Example 11 | 160 | Good | Good | Applicable to the most advanced highly-integrated semiconductor devices | Good |
| Example 12 | 140 | Good | Good | Applicable to highly-integrated semiconductor devices | Fair |
| Example 13 | 90 | Very good | Good | Applicable to the most advanced highly-integrated semiconductor devices | Good |
| Example 14 | 150 | Very good | Very good | Applicable to the most advanced highly-integrated semiconductor devices | Very good |
| Comparative Example 1 | 50 | Good | poor | | poor |
| Comparative Example 2 | 300 | Very poor | Good | | poor |
| Comparative Example 3 | 170 | poor | Fair | | poor |

TABLE 3-continued

| | Polishing test Polishing rate nm/min. | Smoothness | Particle residue | Remarks | Total rating |
|---|---|---|---|---|---|
| Comparative Example 4 | 140 | Good | Very poor | | poor |
| Comparative Example 5 | 180 | Very poor | Fair | | poor |
| Comparative Example 6 | 130 | poor | poor | | poor |
| Comparative Example 7 | — | — | — | — | — |
| Comparative Example 8 | 120 | Very poor | poor | | Very poor |

What is claimed is:

1. A silica-based polishing particle having a three-dimensional polycondensation structure, wherein
the particle contains an alkoxy group therein, the particle having an average particle diameter (d) of 5 to 300 nm, an aspect ratio of 1.00 or more and 1.20 or less, and a carbon content of 0.005% by mass or more and less than 0.50% by mass.

2. The silica-based polishing particle according to claim 1, wherein a content of each of alkali metals, alkali earth metals, Fe, Ti, Zn, Pd, Ag, Mn, Co, Mo, Sn, Al, and Zr is less than 0.1 ppm, a content of each of Cu, Ni, and Cr is less than 1 ppb, and a content of each of U and Th is less than 0.3 ppb.

3. The silica-based polishing particle according to claim 1, wherein a ratio ($\gamma/d$) of a dynamic light scattering particle diameter ($\gamma$) to an average particle diameter (d) is 1.00 or more and 1.50 or less.

4. The silica-based polishing particle according to claim 1, wherein a ratio ($\gamma^1/d$) of an equivalent spherical particle diameter ($\gamma^1$) calculated from a specific surface area (SA) in accordance with a BET method to the average particle diameter (d) is 0.80 or more and less than 1.00.

5. The silica-based polishing particle according to claim 2, wherein a ratio ($\gamma/d$) of a dynamic light scattering particle diameter ($\gamma$) to an average particle diameter (d) is 1.00 or more and 1.50 or less.

6. The silica-based polishing particle according to claim 2, wherein a ratio ($\gamma^1/d$) of an equivalent spherical particle diameter ($\gamma^1$) calculated from a specific surface area (SA) in accordance with a BET method to the average particle diameter (d) is 0.80 or more and less than 1.00.

7. The silica-based polishing particle according to claim 3, wherein a ratio ($\gamma^1/d$) of an equivalent spherical particle diameter ($\gamma^1$) calculated from a specific surface area (SA) in accordance with a BET method to the average particle diameter (d) is 0.80 or more and less than 1.00.

8. An abrasive comprising the silica-based polishing particle according to claim 1.

9. An abrasive comprising the silica-based polishing particle according to claim 2.

10. An abrasive comprising the silica-based polishing particle according to claim 3.

11. An abrasive comprising the silica-based polishing particle according to claim 4.

* * * * *